(12) United States Patent
Salim et al.

(10) Patent No.: US 9,595,988 B2
(45) Date of Patent: Mar. 14, 2017

(54) COMMUNICATION DEVICE AND METHOD FOR RECEIVING A SIGNAL

(71) Applicant: Intel Corporation, Santa Clara, CA (US)

(72) Inventors: Umer Salim, Antibes (FR); Markus Jordan, Gelsenkirchen (DE); Tobias Scholand, Duisburg (DE); Jean-Xavier Canonici, Cannes (FR); Michael Speth, Krefeld (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/565,454

(22) Filed: Dec. 10, 2014

(65) Prior Publication Data

US 2016/0173154 A1    Jun. 16, 2016

(51) Int. Cl.
| | | |
|---|---|---|
| *H04B 1/10* | (2006.01) | |
| *H04B 1/7103* | (2011.01) | |
| *H04B 1/7117* | (2011.01) | |
| *H04J 11/00* | (2006.01) | |

(52) U.S. Cl.
CPC ......... *H04B 1/1081* (2013.01); *H04B 1/7103* (2013.01); *H04B 1/7117* (2013.01); *H04J 11/005* (2013.01); *H04J 11/0063* (2013.01)

(58) Field of Classification Search
USPC ................................ 455/305, 296, 303, 306
See application file for complete search history.

(56) References Cited

U.S. PATENT DOCUMENTS

| | | | |
|---|---|---|---|
| 6,515,980 B1 | 2/2003 | Bottomley | |
| 7,991,378 B2* | 8/2011 | Lindoff | H04L 27/0014 375/326 |
| 8,204,534 B2* | 6/2012 | Kawagishi | H04W 52/42 370/332 |
| 8,385,487 B2* | 2/2013 | Tomatis | H04B 1/7115 375/347 |
| 2001/0028677 A1 | 10/2001 | Wang et al. | |
| 2003/0086482 A1 | 5/2003 | Shimizu et al. | |

(Continued)

FOREIGN PATENT DOCUMENTS

| | | |
|---|---|---|
| EP | 0717505 A2 | 6/1996 |
| WO | 2007057427 A1 | 5/2007 |
| WO | 2009147003 A1 | 12/2009 |

OTHER PUBLICATIONS

Taiwanese Office Action based on Application No. 104136518(9 pages and 10 pages of English translation) dated Dec. 7, 2016.

*Primary Examiner* — Edward Urban
*Assistant Examiner* — Ralph H Justus

(57) ABSTRACT

A communication device is described comprising a plurality of receive paths, wherein each of the plurality of receive paths is configured to extract a multipath component of a received signal, a determiner configured to determine whether at least two of the plurality of receive paths fulfil a mutual interference correlation criterion among the plurality of receive paths and a processor configured, if at least two of the plurality of receive paths fulfil the interference correlation criterion among the plurality of receive paths, to determine the sent signal based on canceling or mitigating the interference between the multipath components of the received signal extracted by the at least two receive paths.

16 Claims, 8 Drawing Sheets

(56) References Cited

U.S. PATENT DOCUMENTS

| | | | | |
|---|---|---|---|---|
| 2004/0028121 | A1* | 2/2004 | Fitton | H04B 17/345 375/144 |
| 2006/0227908 | A1 | 10/2006 | Scharf et al. | |
| 2007/0291827 | A1* | 12/2007 | Hasegawa | H04B 1/712 375/148 |
| 2009/0220032 | A1* | 9/2009 | Rosenqvist | H04B 1/7103 375/340 |
| 2009/0238246 | A1* | 9/2009 | Dawid | H04B 1/712 375/148 |
| 2011/0002283 | A1* | 1/2011 | Drugge | H04B 1/7103 370/329 |
| 2012/0002769 | A1* | 1/2012 | Demaj | H04B 1/7117 375/347 |
| 2012/0069940 | A1* | 3/2012 | Guo | H04B 1/711 375/346 |
| 2012/0147995 | A1* | 6/2012 | Dawid | H04B 1/712 375/316 |
| 2015/0078428 | A1* | 3/2015 | Balraj | H04B 1/1081 375/230 |

* cited by examiner

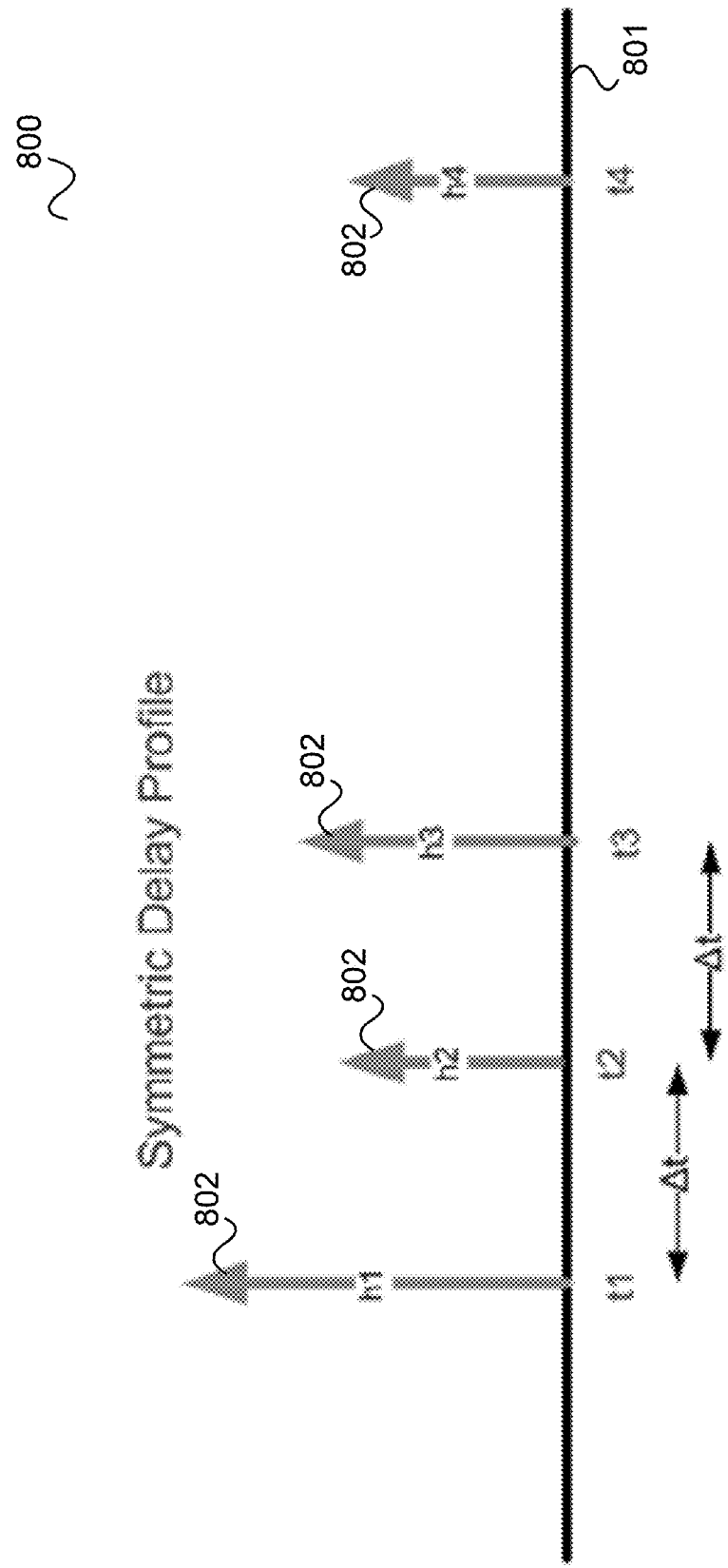

COMMUNICATION DEVICE AND METHOD FOR RECEIVING A SIGNAL

TECHNICAL FIELD

Embodiments described herein generally relate to communication devices and methods for receiving a signal.

BACKGROUND

Depending on the radio environment, a signal sent by a sender (e.g. a base station) to a receiver (e.g. a mobile terminal) may reach the subscriber terminal via a plurality of radio propagation paths such that the signal as received by the receiver includes a plurality of multipath components. These multipath components may be extracted by means of a rake receiver which allows a determination of the signal as sent based on the extracted multipath components. However, the performance of a rake receiver typically suffers when there is interference present in the multipath components which is correlated over the multipath components. Approaches to efficiently handle such scenarios are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 8 shows a delay profile illustrating a symmetric delay profile.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The rake receiver is the typical receiver for a subscriber terminal of a 3G (third generation) cellular mobile communication system for demodulation of WCDMA (wideband code division multiple access) signals. The principle of the rake receiver can be seen to be to extract and combine the different multi-path components of a transmitted signal in direct proportion to the respective signal energy present in the multi-path components. This is typically referred to as maximum ratio combining (MRC).

This rake approach can also be applied to a diversity rake receiver with two (or more) receive antennas considering diversity fingers as independent fingers. However, usage of the rake approach in this case may become sub-optimal in the presence of interference over multi-path components whether it is due to inter-cell interference signals or intra-cell interference signals. This may be addressed by so-called Wiener Interference Cancellation (WIC). A WIC based rake receiver is able to combat inter- and intra-cell interference for enhanced demodulation performance. According to the WIC approach for a diversity rake receiver interference for each individual finger (signal path) impinging upon diversity antennas is canceled. Then the resulting signals are combined for diversity fingers in MRC sense under the assumption of uncorrelated temporal signal reception for multiple fingers. However, when temporal correlation is present, MRC temporal finger combining for a rake receiver, be it a single antenna or a diversity receiver, typically becomes sub-optimal.

Figure 1:
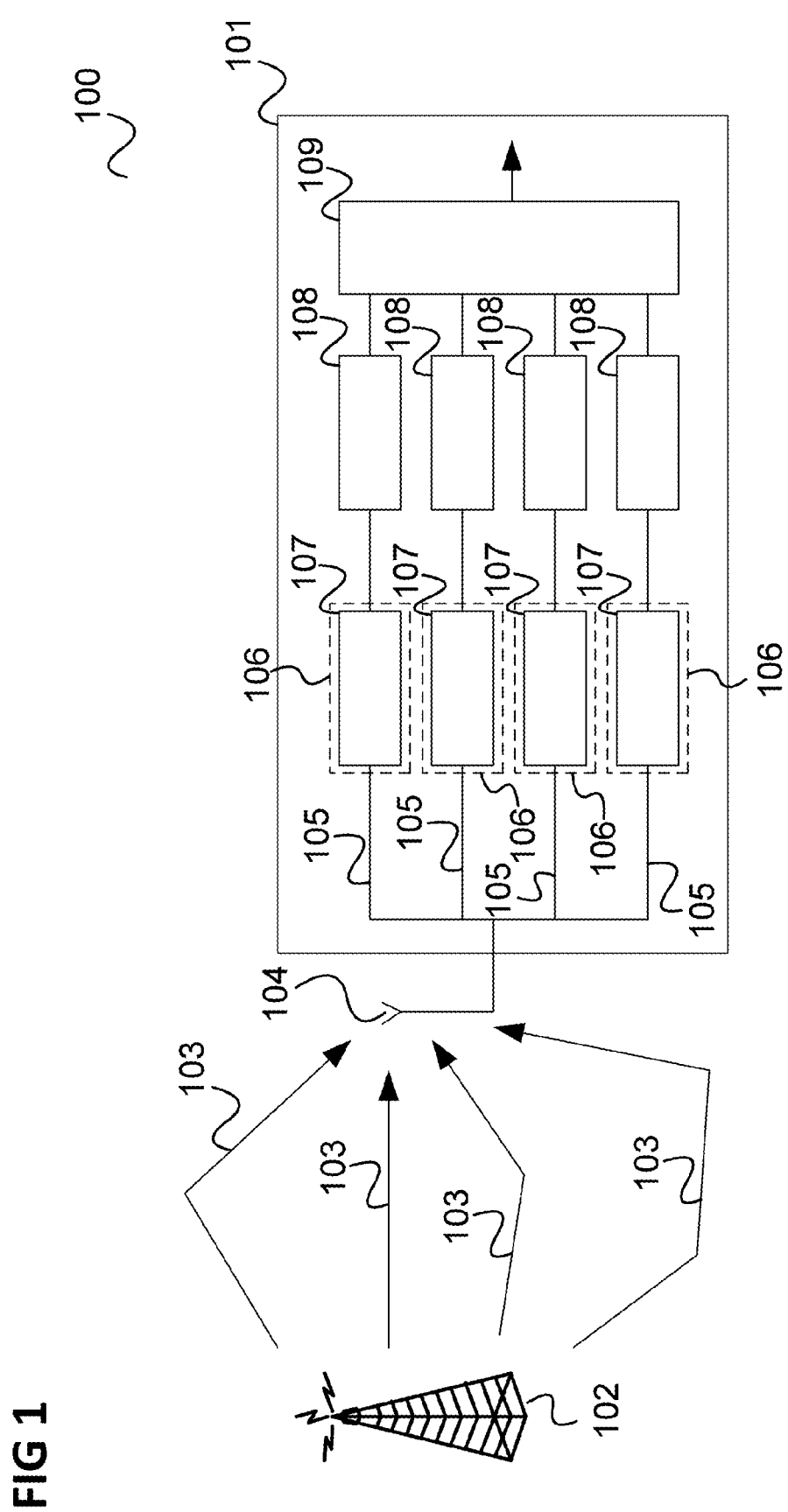
FIG. 1 shows a communication arrangement with a single antenna rake receiver.

FIG. 1 shows a communication arrangement 100 with a single antenna rake receiver 101 as an example.

The following can also be applied to a diversity receiver by assuming that diversity fingers for each delayed path (i.e. multipath component receive path) have already been combined either by simple path-weighting (MRC), spatial interference cancellation WIC filters or some other mechanism.

The rake receiver 101 receives a signal from a sender 102 (e.g. a base station) via a plurality of radio propagation paths 103 by means of an antenna 104.

The rake receiver 101 includes a number $N_f$ of receive paths 105. Each of the receive paths 105 includes a rake finger 106 which in turn may include a despreader 107 (as well as other components). Each receive path 105 further includes a weighting unit 108. The weighting unit 108 of each receive path 105 is connected to a combiner 109.

Due to the multiple propagation paths 103, the signal as received at the antenna 104 includes multiple images (or versions) of the transmitted signal with each signal image generally suffering from a different path delay, phase and attenuation effects, namely one version for each radio propagation path 103. These versions of the transmitted signal are in the following referred to as the multipath components of the received signal.

In the rake receiver 101, each of the signal paths 105 and each of the rake fingers 106 is allocated to one of the radio propagation paths 103. That is, each of the rake fingers 106 receives its own image (or version) of the transmitted signal as input signal. Each of the rake fingers 106 is time-aligned to process its input signal at an assigned radio propagation path delay. For this purpose, each of the signal paths 105 for example contains a delay element (not shown) to delay its input signal corresponding to the relative delays between the multiple propagation paths 103.

Figure 2:
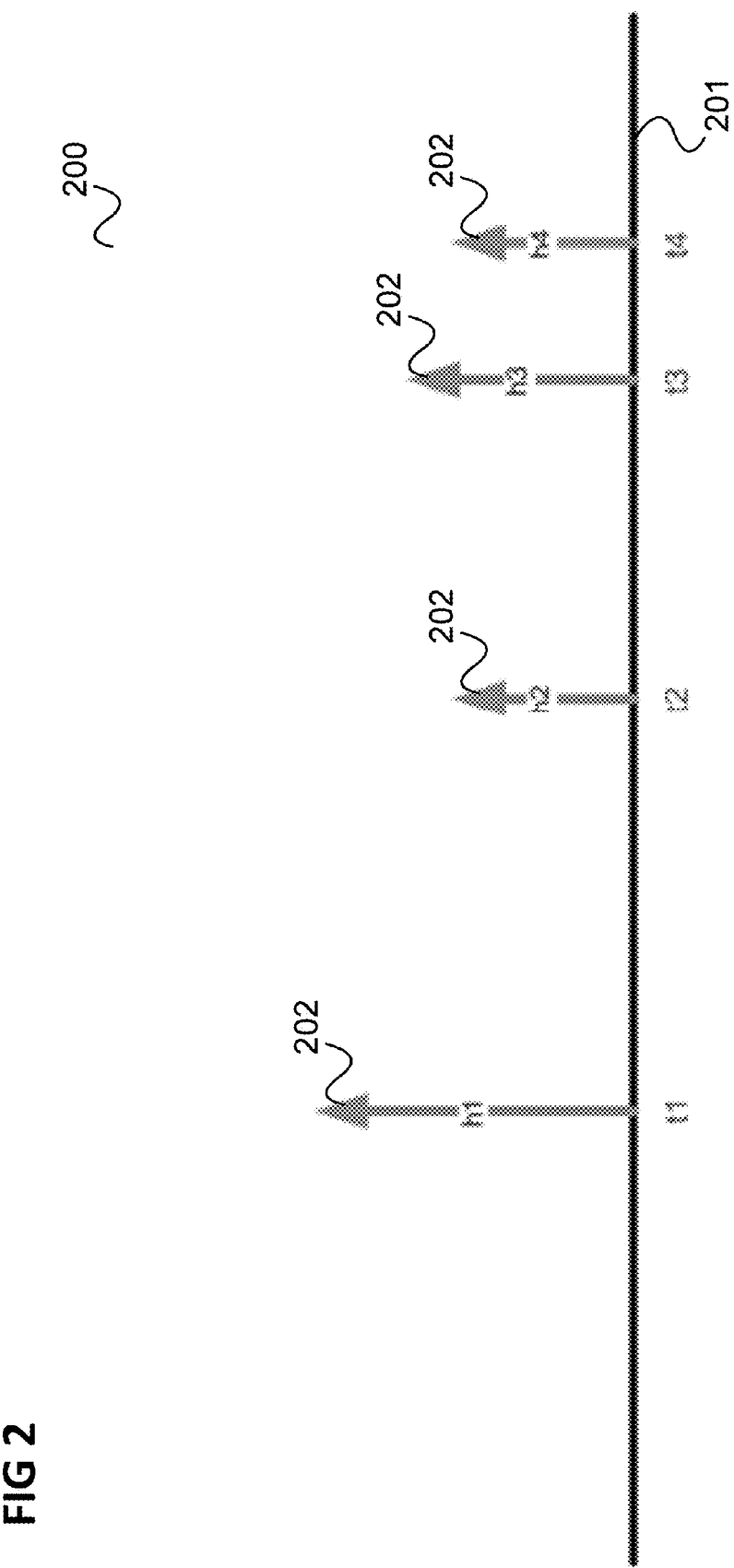
FIG. 2 shows an exemplary delay profile of a multipath environment.

FIG. 2 shows an exemplary delay profile 200 where a signal is being received via four radio propagation paths with different delays $t_1$ to $t_4$.

Time increases from left to right along the horizontal axis 201.

Each of a plurality of arrows 202 indicates the time of arrival $t_f$ of the multipath component extracted by the fth receive path or finger (f=1, . . . , 4). The scalar channel coefficient of the fth propagation path, i.e. the path via which the receiver 101 receives the multipath component of the fth receive path, is denoted by $h_f$.

The signal transmitted by the sender 102 is for example spread by means of a spreading code according to CDMA (Code Division Multiple Access). Each multipath component is despread in the respective rake finger 106 by means of the despreaders (or correlators) 107. For example, in case of a DSSS (Direct Sequence Spread Spectrum)-CDMA communication, the RAKE fingers 106 may include a plurality of despreaders each operating on a different DSSS data signal. The despreaders 107 correlate the multipath components with a chip sequence to obtain corresponding despread multipath components. The chip sequence may be generated by a chip sequence generator (not shown).

After despreading, the despread multipath components are weighted by the weighting units 108. The weighted signals are then combined by the combiner 109. For example, the combiner 109 may be based on the maximum ratio combining technique in order to obtain a combined signal with a maximum signal-to-noise ratio and a minimized bit error rate.

For example a scalar signal value for the fth receive path $y_f$ is given by $$y_f = h_f x + e_f$$

wherein x is the corresponding scalar transmitted symbol of the transmitted signal and $e_f$ is an interference plus noise value for the fth receive path.

The combiner 109 for example uses the complex conjugates of estimates $\hat{h}_f$ of the channel coefficients $h_f$ as weights for the weighting such that it reconstructs the transmitted symbol x as $$\hat{x} = \sum_{f=1}^{N_f} \hat{h}_f^* y_f.$$

As mentioned, in case of temporal correlation of interference between different fingers, the performance of MRC temporal finger combining for a rake receiver as described above typically suffers. In the following, a communication device is described having a receiver which can be seen to exploit correlation among time-delayed fingers.

Figure 3:
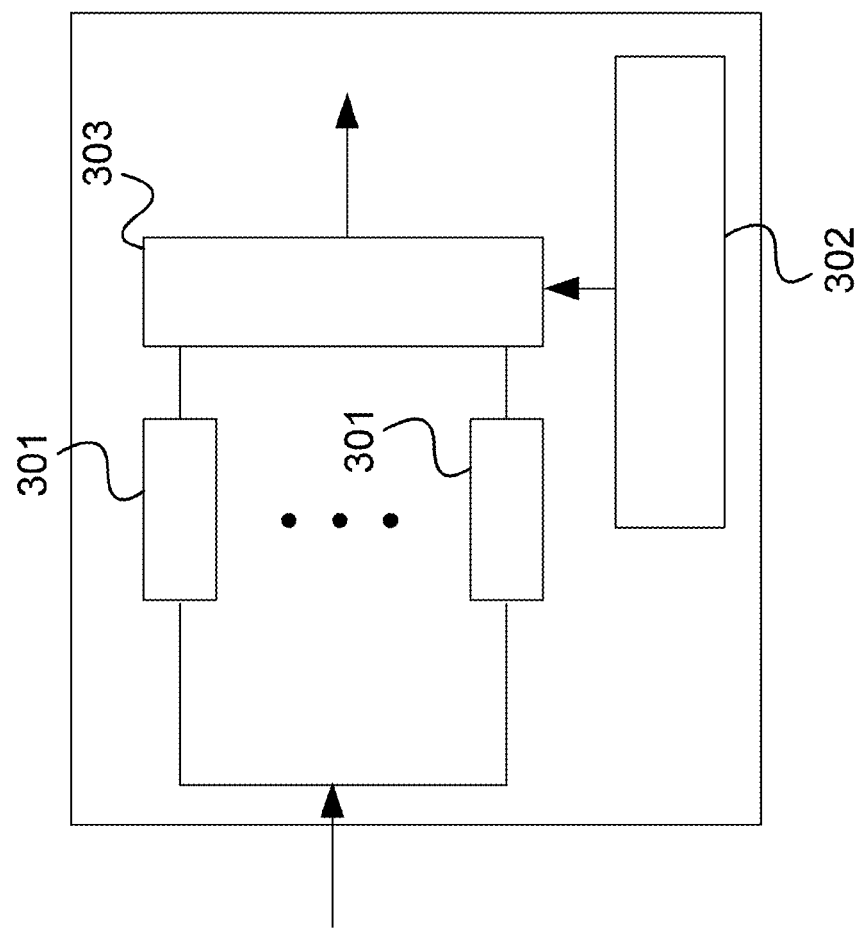
FIG. 3 shows a communication device.

FIG. 3 shows a communication device 300.

The communication device includes a plurality of receive paths 301, wherein each of the plurality of receive paths 301 is configured to extract a multipath component of a received signal (e.g. a signal received from a sender).

The communication device 300 further includes a determiner 302 configured to determine whether at least two of the plurality of receive paths fulfil a mutual interference correlation criterion among the plurality of receive paths 301.

Further, the communication device 300 includes a processor 303 configured, if at least two of the plurality of receive paths fulfil the interference correlation criterion among the plurality of receive paths 301, to determine a sent signal (i.e. the signal as sent by a sender and received by the communication device as the received signal) based on canceling or mitigating the interference between the multipath components extracted by the at least two receive paths.

In other words, a communication device, e.g. a radio communication device, for example a communication terminal such as a subscriber terminal of a mobile cellular communication network, checks whether there is an expected correlation of the interference present in the multipath components of a received signal. If correlation can be expected, e.g. due to the delay profile of its multipath components, the communication device groups these multipath components and applies interference cancellation or mitigation to the resulting group to determine the signal as it was sent (in other words detect or reconstruct the signal or data as sent).

In other words, temporal correlation of interference and noise among different multipath components is exploited (if present) by applying a temporal interference cancellation or mitigation which includes identifying subsets of fingers with (expected) significant correlation which can be exploited and cancelling or at least mitigating interference within each subset.

The components of the communication device (e.g. the receive paths, the determiner and the processor) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 4:
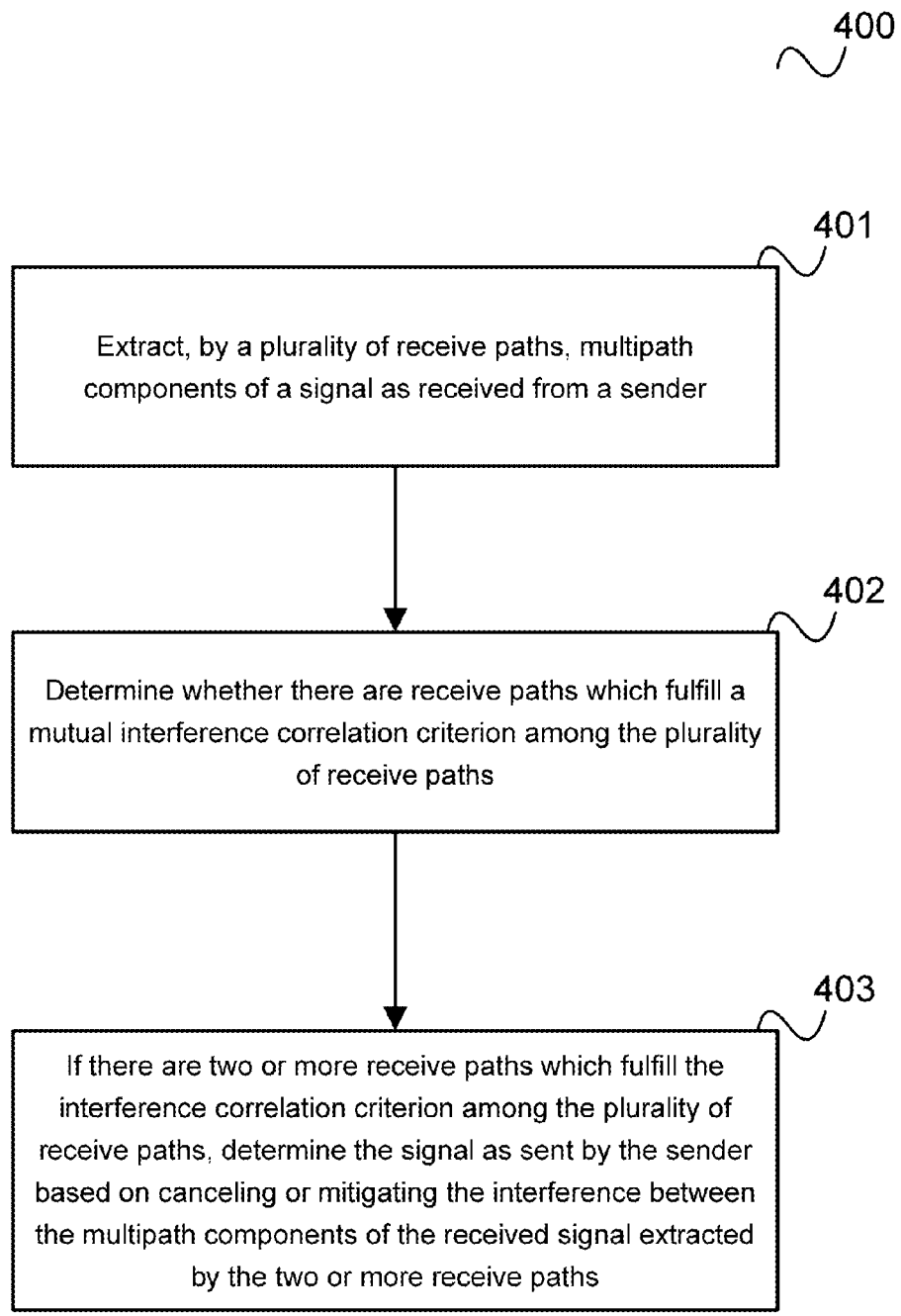
FIG. 4 shows a flow diagram illustrating a method for receiving a signal.

The communication device 300 for example carries out a method as illustrated in FIG. 4.

FIG. 4 shows a flow diagram 400 illustrating a method for receiving a signal, for example carried out by a communication device.

In 401, each of a plurality of receive paths extract a multipath component of a received signal.

In 402, the communication device determines whether at least two of the plurality of receive paths fulfil a mutual interference correlation criterion among the plurality of receive paths.

In 403, if at least two of the plurality of receive paths fulfil the interference correlation criterion among the plurality of receive paths, the communication device determines a sent signal based on canceling or mitigating the interference between the multipath components of the received signal extracted by the at least two receive paths.

The following examples pertain to further embodiments.

Example 1 is a communication device as illustrated in FIG. 3.

In Example 2, the subject matter of Example 1 may optionally include the mutual interference correlation criterion being whether an interference present in one receive path of the plurality of receive paths is expected to be correlated to an interference present in another receive path of the plurality of receive paths.

In Example 3, the subject matter of any one of Examples 1-2 may optionally include the mutual interference correlation criterion being whether a symmetric timing relation exists between an interference signal, a multipath component extracted by one receive path of the plurality of receive paths and a multipath component extracted by another receive path of the plurality of receive paths.

In Example 4, the subject matter of any one of Examples 1-3 may optionally include the mutual interference correlation criterion being whether a sender of the sent signal has a symmetric delay profile with respect to the multipath components or whether another sender sending an interference signal has a symmetric delay profile with respect to the multipath components.

In Example 5, the subject matter of any one of Examples 1-4 may optionally include the mutual interference criterion being whether a difference between the time of arrival of an interference signal at a first receive path of the plurality of receive paths and the time of arrival of an interference signal at a second receive path of the plurality of receive paths is within a predetermined range of a propagation delay difference between the multipath components of the first receive path and the second receive path.

In Example 6, the subject matter of Example 5 may optionally include the interference signal being a signal transmitted by another sender.

In Example 7, the subject matter of Example 6 may optionally include the determiner being configured to determine whether at least two of the plurality of receive paths fulfil the mutual interference correlation criterion among the plurality of receive paths based on a delay profile of the other sender.

In Example 8, the subject matter of any one of Examples 5-7 may optionally include the interference signal being a multipath component of a third receive path.

In Example 9, the subject matter of Example 8 may optionally include the determiner being configured to determine whether at least two of the plurality of receive paths fulfil the mutual interference correlation criterion among the plurality of receive paths based on a delay profile of a sender of the sent signal.

In Example 10, the subject matter of any one of Examples 1-9 may optionally include the processor being configured to group at least two receive paths fulfilling the mutual interference correlation criterion to a receive path group, to apply interference cancellation or mitigation to the receive path group and determine the sent signal based on a result of the application of interference cancellation or mitigation to the receive path group.

In Example 11, the subject matter of any one of Examples 1-10 may optionally include the processor being configured to determine the sent signal based on canceling or mitigating the interference between the multipath components of the received signal extracted by the at least two receive paths based on an estimation of a cross correlation of the interference between the at least two receive paths.

In Example 12, the subject matter of any one of Examples 1-11 may optionally include the processor being configured to determine the sent signal based on canceling or mitigating the interference between the multipath components of the received signal extracted by the at least two receive paths based on an application of a minimum mean square error interference cancellation or mitigation to the plurality of receive paths which fulfil the interference correlation criterion.

In Example 13, the subject matter of any one of Examples 1-12 may optionally include each multipath component corresponding to the received signal as received via a respective radio propagation path between a sender of the sent signal and the communication device.

In Example 14, the subject matter of any one of Examples 1-13 may optionally include each receive path being configured to extract the respective multipath component by despreading the received signal based on a propagation delay of the corresponding radio propagation path.

In Example 15, the subject matter of any one of Examples 1-14 may optionally include the communication device being a subscriber terminal of a cellular mobile communication network and the sent signal being sent by a base station of the cellular mobile communication network.

In Example 16, the subject matter of any one of Examples 1-15 may optionally include the communication device comprising a rake receiver and the plurality of receive paths being implemented by a plurality of rake receiver fingers.

Example 17 is a method for receiving a signal as illustrated in FIG. 4.

In Example 18, the subject matter of Example 17 may optionally include the mutual interference correlation criterion being whether an interference present in one receive path of the plurality of receive paths is expected to be correlated to an interference present in another receive path of the plurality of receive paths.

In Example 19, the subject matter of any one of Examples 17-18 may optionally include the mutual interference correlation criterion being whether a symmetric timing relation exists between an interference signal, a multipath component extracted by one receive path of the plurality of receive paths and a multipath component extracted by another receive path of the plurality of receive paths.

In Example 20, the subject matter of any one of Examples 17-19 may optionally include the mutual interference correlation criterion being whether a sender of the sent signal has a symmetric delay profile with respect to the multipath components or whether another sender sending an interference signal has a symmetric delay profile with respect to the multipath components.

In Example 21, the subject matter of any one of Examples 17-20 may optionally include the mutual interference criterion being whether a difference between the time of arrival of an interference signal at a first receive path of the plurality of receive paths and the time of arrival of an interference signal at a second receive path of the plurality of receive paths is within a predetermined range of a propagation delay difference between the multipath components of the first receive path and the second receive path.

In Example 22, the subject matter of Example 21 may optionally include the interference signal being a signal transmitted by another sender.

In Example 23, the subject matter of Example 22 may optionally include determining whether at least two of the plurality of receive paths fulfil the mutual interference correlation criterion among the plurality of receive paths based on a delay profile of the other sender.

In Example 24, the subject matter of any one of Examples 21-23 may optionally include the interference signal being a multipath component of a third receive path.

In Example 25, the subject matter of Example 24 may optionally include determining whether at least two of the plurality of receive paths fulfil the mutual interference correlation criterion among the plurality of receive paths based on a delay profile of a sender of the sent signal.

In Example 26, the subject matter of any one of Examples 17-25 may optionally include grouping at least two receive paths fulfilling the mutual interference correlation criterion to a receive path group, applying interference cancellation or mitigation to the receive path group and determining the sent signal based on a result of the application of interference cancellation or mitigation to the receive path group.

In Example 27, the subject matter of any one of Examples 17-26 may optionally include determining the sent signal based on canceling or mitigating the interference between the multipath components of the received signal extracted by the at least two receive paths based on an estimation of a cross correlation of the interference between the at least two receive paths.

In Example 28, the subject matter of any one of Examples 17-27 may optionally include determining the sent signal based on canceling or mitigating the interference between the multipath components of the received signal extracted by the at least two receive paths based on an application of a minimum mean square error interference cancellation or mitigation to the plurality of receive paths which fulfil the interference correlation criterion.

In Example 29, the subject matter of any one of Examples 17-28 may optionally include each multipath component corresponding to the received signal as received via a respective radio propagation path between a sender of the sent signal and the communication device.

In Example 30, the subject matter of any one of Examples 17-29 may optionally include each receive path extracting the respective multipath component by despreading the received signal based on a propagation delay of the corresponding radio propagation path.

In Example 31, the subject matter of any one of Examples 17-30 may optionally include the communication device being a subscriber terminal of a cellular mobile communication network and the sent signal being sent by a base station of the cellular mobile communication network.

In Example 32, the subject matter of any one of Examples 17-31 may optionally include the communication device comprising a rake receiver and the plurality of receive paths being implemented by a plurality of rake receiver fingers.

Example 33 is a computer readable medium having recorded instructions thereon which, when executed by a processor, make the processor perform a method for performing radio communication according to any one of Examples 17-32.

Example 34 is a communication device comprising a plurality of receive paths, wherein each of the plurality of receive paths is for extracting a multipath component of a received signal; a determining means for determining whether at least two of the plurality of receive paths fulfil a mutual interference correlation criterion among the plurality of receive paths; and a processing means for, if at least two of the plurality of at least two receive paths fulfil the interference correlation criterion among the plurality of receive paths, determining a sent signal based on canceling or mitigating the interference between the multipath components of the received signal extracted by the at least two receive paths.

In Example 35, the subject matter of Example 34 may optionally include the mutual interference correlation criterion being whether an interference present in one receive path of the plurality of receive paths is expected to be correlated to an interference present in another receive path of the plurality of receive paths.

In Example 36, the subject matter of any one of Examples 34-35 may optionally include the mutual interference correlation criterion being whether a symmetric timing relation exists between an interference signal, a multipath component extracted by one receive path of the plurality of receive paths and a multipath component extracted by another receive path of the plurality of receive paths.

In Example 37, the subject matter of any one of Examples 34-36 may optionally include the mutual interference correlation criterion being whether a sender of the sent signal has a symmetric delay profile with respect to the multipath components or whether another sender sending an interference signal has a symmetric delay profile with respect to the multipath components.

In Example 38, the subject matter of any one of Examples 34-37 may optionally include the mutual interference criterion being whether a difference between the time of arrival of an interference signal at a first receive path of the plurality of receive paths and the time of arrival of an interference signal at a second receive path of the plurality of receive paths is within a predetermined range of a propagation delay difference between the multipath components of the first receive path and the second receive path.

In Example 39, the subject matter of Example 38 may optionally include the interference signal being a signal transmitted by another sender.

In Example 40, the subject matter of Example 39 may optionally include the determining means being for determining whether at least two of the plurality of receive paths fulfil the mutual interference correlation criterion among the plurality of receive paths based on a delay profile of the other sender.

In Example 41, the subject matter of any one of Examples 38-40 may optionally include the interference signal being a multipath component of a third receive path.

In Example 42, the subject matter of Example 41 may optionally include the determining means being for determining whether at least two of the plurality of receive paths fulfil the mutual interference correlation criterion among the plurality of receive paths based on a delay profile of a sender of the sent signal.

In Example 43, the subject matter of any one of Examples 34-42 may optionally include the processing means being for grouping at least two receive paths fulfilling the mutual interference correlation criterion to a receive path group, applying interference cancellation or mitigation to the receive path group and determining the sent signal based on a result of the application of interference cancellation or mitigation to the receive path group.

In Example 44, the subject matter of any one of Examples 34-43 may optionally include the processing means being for determining the sent signal based on canceling or mitigating the interference between the multipath components of the received signal extracted by the at least two receive paths based on an estimation of a cross correlation of the interference between the at least two receive paths.

In Example 45, the subject matter of any one of Examples 34-44 may optionally include the processing means being for determining the sent signal based on canceling or mitigating the interference between the multipath components of the received signal extracted by the at least two receive paths based on an application of a minimum mean square error interference cancellation or mitigation to the plurality of receive paths which fulfil the interference correlation criterion.

In Example 46, the subject matter of any one of Examples 34-45 may optionally include each multipath component corresponding to the received signal as received via a respective radio propagation path between a sender of the sent signal and the communication device.

In Example 47, the subject matter of any one of Examples 34-46 may optionally include each receive path being for extracting the respective multipath component by despreading the received signal based on a propagation delay of the corresponding radio propagation path.

In Example 48, the subject matter of any one of Examples 34-47 may optionally include the communication device being a subscriber terminal of a cellular mobile communication network and the sent signal being sent by a base station of the cellular mobile communication network.

In Example 49, the subject matter of any one of Examples 34-48 may optionally include the communication device comprising a rake receiver and the plurality of receive paths being implemented by a plurality of rake receiver fingers.

It should be noted that one or more of the features of any of the examples above may be combined with any one of the other examples.

Figure 5:
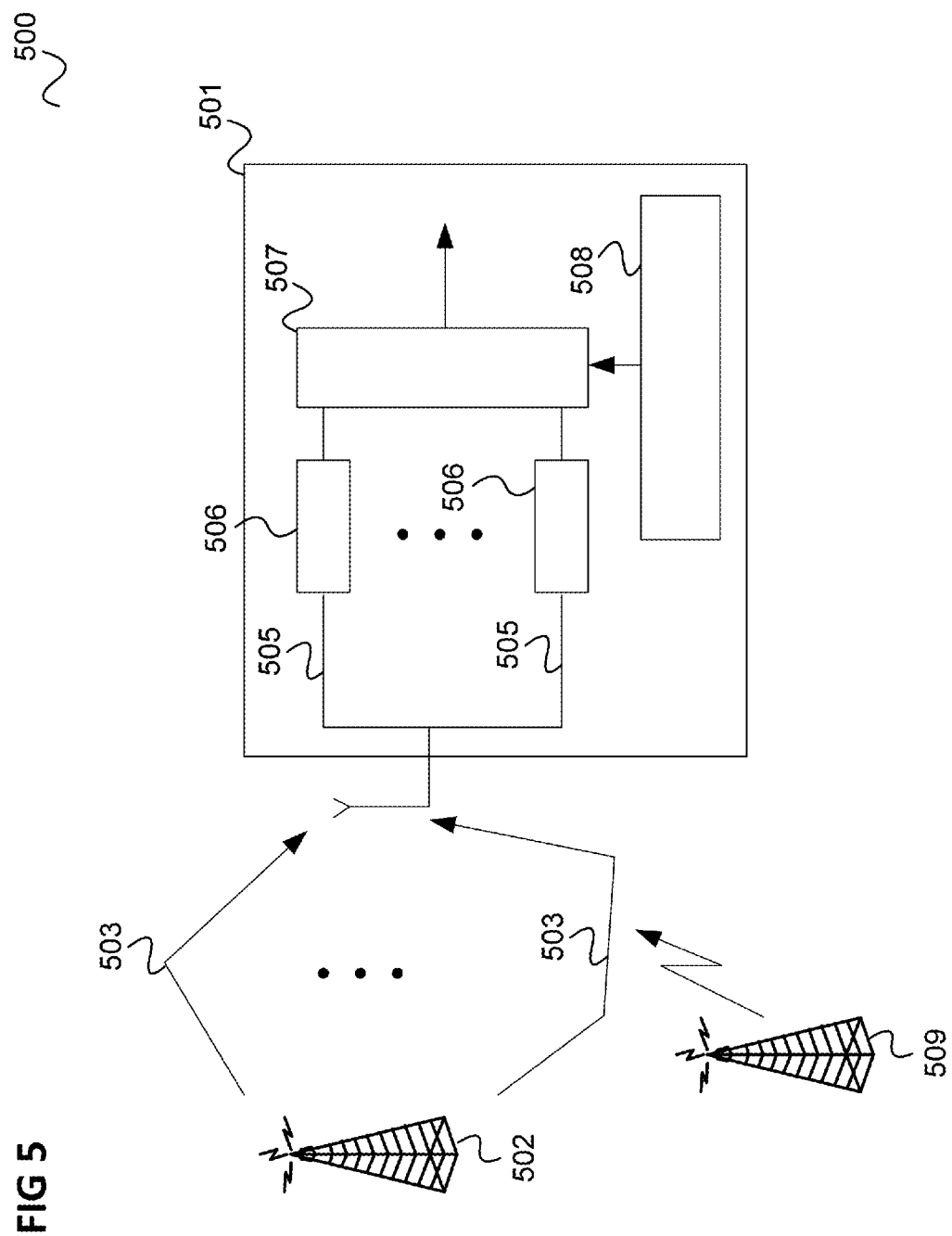
FIG. 5 shows communication arrangement.

In the following, examples are described in more detail for a scenario as illustrated in FIG. 5.

FIG. 5 shows communication arrangement 500.

The communication arrangement 500 includes a communication device 501, e.g. corresponding to the communication device 300, which receives a signal form a sender 502 (e.g. a base station) via a plurality of radio propagation paths 503 by means of an antenna 504.

Similarly to the rake receiver 101 the communication device includes a number $N_f$ of receive paths 505 each including a rake finger 506. Each rake finger 506 is coupled to a processor 507. The processor 507 may for example perform the functions of the weighting units 108 and the combiner 109 when there is no expected temporal correlation between the interference of two or more of the rake fingers 506 (i.e. of the multipath components extracted by the rake fingers 506).

The communication device 501 includes a determiner 508, e.g. corresponding to the determiner 302 which determines whether there is no expected temporal correlation between the interference of two or more of the rake fingers 506. If the determiner detects expected temporal correlation, e.g. detects a certain, e.g. predefined, interference scenario, it accordingly forms one or more groups of fingers.

In the following, examples for interference scenarios and corresponding finger subset formation guidelines are given. A first interference scenario (denoted scenario A) relates to the case of inter-cell interference (e.g. where there is a source of interference 509 such as a neighboring base station) and a second interference scenario (denoted scenario B) relates to the case of intra-cell interference.

Scenario A (Inter-cell interference): In certain scenarios, if an interfering signal (e.g. sent by the interference source 509) is being received at the receiver (i.e. the communication device 501 in this case) such that there is some time-delay symmetry between the interfering path and two or more fingers 506, the interference seen at these fingers 506 becomes correlated and can be exploited for improved performance. Such scenarios are illustrated in FIGS. 6 and 7.

Figure 6:
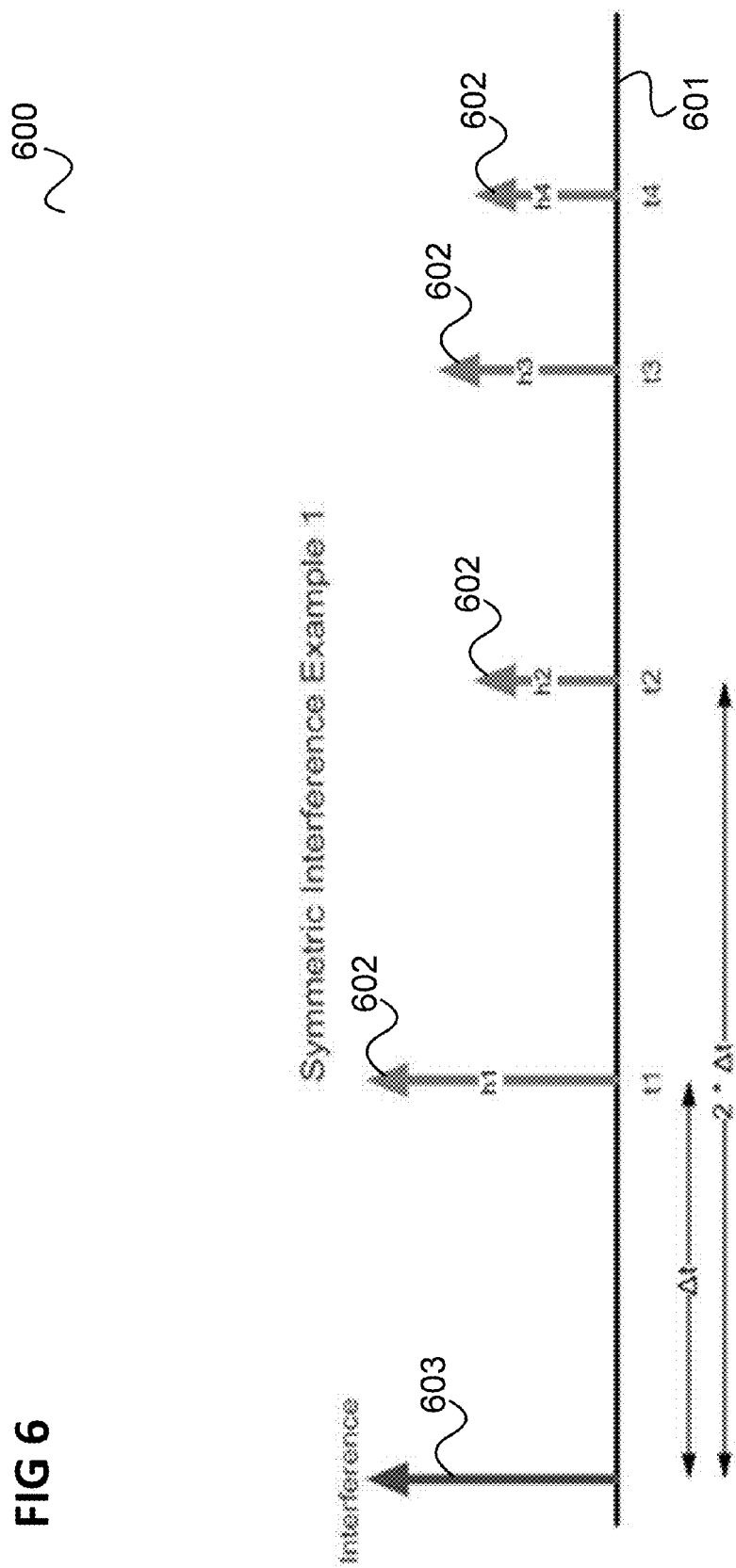
FIG. 6 shows a delay profile illustrating a first example for a symmetric interference by an interferer.
Figure 7:
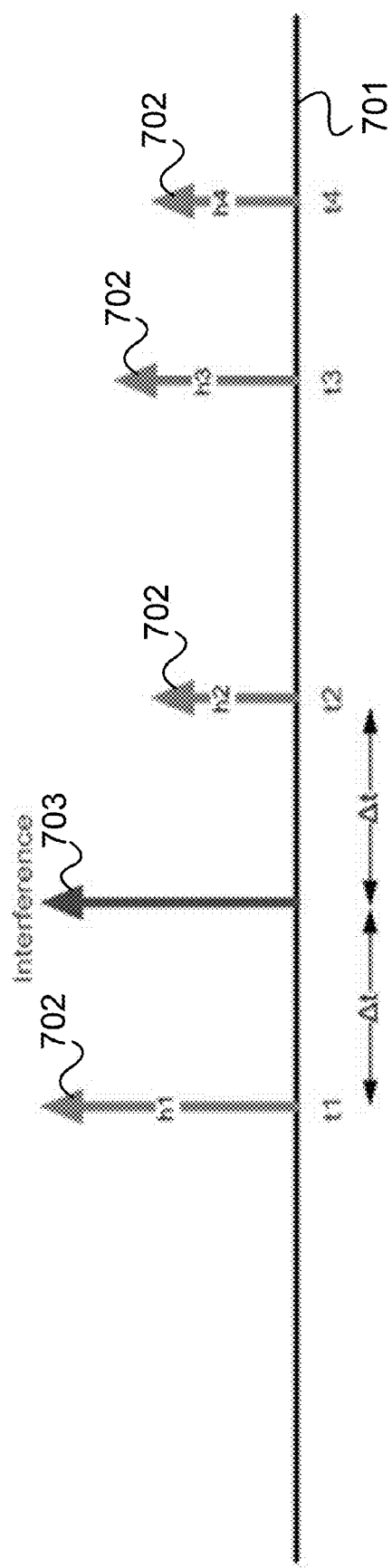
FIG. 7 shows a delay profile illustrating a second example for symmetric interference by an interferer.

FIGS. 6 and 7 show, similarly to FIG. 2, delay profiles 600, 700 where a signal is being received via four radio propagation paths with different delays $t_1$ to $t_4$, time increases from left to right along a respective horizontal axis 601, 701 and each of a plurality of arrows 602, 702 indicates the time of arrival $t_f$ of the multipath component extracted by the fth receive path or finger (f=1, . . . , 4).

In addition to the times of arrival of the multipath components, a further arrow 603, 703 indicates the time of arrival of an interference signal.

As can be seen, in the scenarios illustrated in FIGS. 6 and 7, the inter-cell interference has time symmetry with respect to the first path (with channel coefficient h1) and the second path (with channel coefficient h2). Specifically, in the scenario of FIG. 6, the time difference between the time of arrival of the interference signal and the time of arrival of the multipath component of the first (receive) path is a time $\Delta t$ (interference signal arrives earlier) while the time difference between the time of arrival of the interference and the time of arrival of the multipath component of the second path is $2*\Delta t$ (interference signal arrives earlier). In the scenario of FIG. 7, the time difference between the time of arrival of the interference and the time of arrival of the multipath component of the first receive path is a time $\Delta t$ (interference signal arrives later) while the time difference between the time of arrival of the interference and the time of arrival of the multipath component of the second path is also $\Delta t$ (but the interference signal arrives earlier).

The determiner 508 may for example detect an interference scenario as in FIG. 6 or FIG. 7 based on tracking the delay profiles for the base stations 502, 509. For example, in case of a subscriber terminal of a mobile cellular communication network, the determiner 508 may do the detection based on the tracking of delay profiles for active set base stations and the neighboring base stations in the detected set.

Scenario B (Intra-cell Inter-Tap Interference): Similar temporal correlation scenarios as the ones illustrated in FIGS. 6 and 7 can occur in practice where the delay profile of a base station (or multiple base stations in an active set) is itself time symmetric and strong symmetric temporal correlation is present among the fingers. Such a scenario is illustrated in FIGS. 8.

Similarly to FIGS. 6 and 7, FIG. 8 shows a delay profile 800 with time increasing from left to right along a horizontal axis 801 and each of a plurality of arrows 802 indicating the time of arrival $t_f$ of a multipath component extracted by the $f_{th}$ receive path or finger (f=1, . . . , 4). As can be seen, in the scenario of FIG. 8 the delay profile is symmetric among the fingers 1, 2, 3 and the (inter-tap) interference of any one of these three fingers is symmetric over the other two fingers. For example, as indicated in FIG. 8, the second multipath component, which is interference for the first finger and the third finger, arrives $\Delta t$ after the first multipath component and $\Delta t$ before the third multipath component.

The determiner 508 scenarios may for example detect an interference scenario as illustrated in FIG. 8 based on analyzing the delay profile of the base station 502 (or the active set base stations). It may then control the processor 507 to treat these three fingers jointly in a subset and apply interference cancellation as described in the following. It should be noted that when reference to an interference cancellation is made, this may be understood to include an interference mitigation since a strict cancellation may in certain cases not be possible or not desirable due to side effects (e.g. noise enhancement). Accordingly, the term "interference cancellation or mitigation" is also used to refer to an interference cancellation that may not necessarily be a strict cancellation but possibly only mitigates interference.

It should be noted that in an interference scenario where two times are equal (like the $\Delta t$ occurring between different events in the above examples), the two times being equal may be understood to be equal in terms of the sampling rate with which the receive paths sample the received signal. In other words, for example, if each event is associated with a respective sampling time (at which the communication devices sees it), the time between a pair of events is considered to be equal to the time between another pair of events if the differences between the sampling times are equal. Thus, two times may be considered to be equal if their difference lies within a predetermined range, namely a range such that their difference is indistinguishable with respect to the sampling pattern. For, example, in case of a sampling period of one or more hundreds of nanoseconds, the predetermined range may also have a value of that order.

When the determiner 508 has detected the presence of an interference scenario that fulfils a predefined criterion, e.g. symmetry as illustrated in FIGS. 6 to 8, it groups the fingers to subsets accordingly and controls the processor 509 to apply an interference cancellation filter to each subset. For example, in the scenarios of FIGS. 6 and 7 the first finger and the second finger are grouped to a subset and in the scenario of FIG. 8 the first finger, the second and the third finger are grouped to a subset. The remaining fingers are treated individually e.g. as described with reference to FIG. 1 or can be considered as subsets with a single element.

The interference cancellation is for example applied to the subgroups as follows. Let for example the fingers 505 be grouped in M sub-groups where I-th sub-group has $N_I$ fingers, I=1 . . . M. The vector $Y_I$ of the $N_I$ despread multipath components $y_f$ of the fingers can be written as $$Y_I = H_I x + E_I$$

where $H_I$ is the vector of channel coefficients including the channel coefficient $h_f$ for each of the $N_I$ fingers,
and $E_I$ is an interference+noise including $e_f$ for each of the $N_I$ fingers.

The time domain interference cancellation is for example applied to each group of temporal fingers and then the results of the M groups are combined. For example, the MMSE solution is used for interference cancellation in each subgroup. Let $W_I$ denote the interference cancellation filter applied to Ith finger group. The MMSE solution (temporal WIC solution) is then for example determined according to the equation $$x_I = W_I^H Y_I$$
$$= H_I^H R_{e,I}^{-1} Y_I$$
$$= H_I^H R_{e,I}^{-1} H_I x + H_I^H R_{e,I}^{-1} E_I$$

where $R_{e,I}$ denotes the combined interference plus noise covariance matrix of $N_I$ fingers constituting the I-th temporal group. For example, it is given as $$R_{e,I} = E\{E_I E_I^H\}$$

wherein $E\{.\}$ denotes expected value.

In a mobile communication network according to UMTS, for example, the communication device may estimate this matrix using the common pilot (CPICH) channel.

The results $x_I$ of each subgroup are then combined to an estimate $\bar{x}$ of the transmitted symbol according to $$\bar{x} = \sum_{I=1}^{M} x_I.$$

The approach can for example be very efficiently implemented when each sub-group is restricted to two fingers only (i.e. $N_I$=2). In this case, each covariance matrix $R_{e,I}$ is of size 2×2 and its inversion, required for interference-cancellation filter computation, reduces to the change of position of elements and a division operation by its determinant.

For example, in the intra-cell scenario illustrated in FIG. 8, instead of treating the first three fingers jointly (and constructing bigger interference cancellation matrices), a subset including two fingers could be formed by combining the first finger (h1) and the third (h3) finger. The interference of the second finger (h2) impinges highly correlated interference over these and hence even a 2×2 covariance matrix computed for this subset can be expected to capture a significant portion of the gain realizable by computationally complex joint treatment. Thus, it can be seen that a trade-off of algorithm performance and its computation complexity may be made. The size of the finger subset treated jointly, $N_I$, can be selected as per the performance requirements and affordable complexity.

The approach described above can bring considerable performance improvement in a rake receiver in the scenarios where channel paths are delay symmetric or inter-cell interference is symmetric or by forcing symmetric interference. It can be implemented easily inside a RAKE receiver by additional covariance estimation. In case of a (2×2) WIC spatial solution being already implemented, additional implementation effort may be avoided by feeding the samples for temporal fingers as if they were samples corresponding to one finger received over multiple spatial branches.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
a plurality of receive paths, wherein each of the plurality of receive paths is configured to extract a multipath component of a received signal;
a determiner configured to determine whether at least two of the plurality of receive paths fulfill a mutual interference correlation criterion among the plurality of receive paths; and
a processor configured, if at least two of the plurality of receive paths fulfill the interference correlation criterion among the plurality of receive paths, to group at least two multipath components and an interference signal into a subset and to cancel or mitigate the subset based on the mutual interference correlation;
wherein the mutual interference correlation criterion is at least one selected from the group consisting of:
whether a symmetric timing relation exists between an interference signal, a multipath component extracted by one receive path of the plurality of receive paths and a multipath component extracted by another receive path of the plurality of receive paths;
whether a sender of the sent signal has a symmetric delay profile with respect to the multipath components or whether another sender sending an interference signal has a symmetric delay profile with respect to the multipath components; or
whether a difference between the time of arrival of an interference signal at a first receive path of the plurality of receive paths and the time of arrival of an interference signal at a second receive path of the plurality of receive paths is within a predetermined range of a propagation delay difference between the multipath components of the first receive path and the second receive path.

2. The communication device of claim 1, wherein the mutual interference correlation criterion is whether an interference present in one receive path of the plurality of receive paths is expected to be correlated to an interference present in another receive path of the plurality of receive paths.

3. The communication device of claim 1, wherein the interference signal is a signal transmitted by another sender.

4. The communication device of claim 3, wherein the determiner is configured to determine whether at least two of the plurality of receive paths fulfil the mutual interference correlation criterion among the plurality of receive paths based on a delay profile of the other sender.

5. The communication device of claim 1, wherein the interference signal is a multipath component of a third receive path.

6. The communication device of claim 5, wherein the determiner is configured to determine whether at least two of the plurality of receive paths fulfil the mutual interference correlation criterion among the plurality of receive paths based on a delay profile of a sender of the sent signal.

7. The communication device of claim 1, wherein the processor is configured to group at least two receive paths fulfilling the mutual interference correlation criterion to a receive path group, to apply interference cancellation or mitigation to the receive path group and determine the sent signal based on a result of the application of interference cancellation or mitigation to the receive path group.

8. The communication device of claim 1, wherein the processor is configured to determine the sent signal based on canceling or mitigating the interference between the multipath components of the received signal extracted by the at least two receive paths based on an estimation of a cross correlation of the interference between the at least two receive paths.

9. The communication device of claim 1, wherein the processor is configured to determine the sent signal based on canceling or mitigating the interference between the multipath components of the received signal extracted by the at least two receive paths based on an application of a minimum mean square error interference cancellation or mitigation to the plurality of receive paths which fulfil the interference correlation criterion.

10. The communication device of claim 1, wherein each multipath component corresponds to the received signal as received via a respective radio propagation path between a sender of the sent signal and the communication device.

11. The communication device of claim 1, wherein each receive path is configured to extract the respective multipath component by despreading the received signal based on a propagation delay of the corresponding radio propagation path.

12. The communication device of claim 1, wherein the communication device is a subscriber terminal of a cellular mobile communication network and the sent signal is sent by a base station of the cellular mobile communication network.

13. The communication device of claim 1, wherein the communication device comprises a rake receiver and the plurality of receive paths are implemented by a plurality of rake receiver fingers.

14. A method for receiving a signal comprising:
    each of a plurality of receive paths extracting a multipath component of a received signal;
    determining whether at least two of the plurality of receive paths fulfill a mutual interference correlation criterion among the plurality of receive paths;
    grouping at least two multipath components and an interference signal into a subset: and if at least two of the plurality of receive paths fulfill the interference correlation criterion among the plurality of receive paths, canceling or mitigating the subset based on the mutual interference correlation; wherein the mutual interference correlation criterion is at least one selected from the group consisting of:
        whether a symmetric timing relation exists between an interference signal, a multipath component extracted by one receive path of the plurality of receive paths and a multipath component extracted by another receive path of the plurality of receive paths;
        whether a sender of the sent signal has a symmetric delay profile with respect to the multipath components or whether another sender sending an interference signal has a symmetric delay profile with respect to the multipath components; or
        whether a difference between the time of arrival of an interference signal at a first receive path of the plurality of receive paths and the time of arrival of an interference signal at a second receive path of the plurality of receive paths is within a predetermined range of a propagation delay difference between the multipath components of the first receive path and the second receive path.

15. The method of claim 14, wherein the mutual interference correlation criterion is whether an interference present in one receive path of the plurality of receive paths is expected to be correlated to an interference present in another receive path of the plurality of receive paths.

16. A non-transitory computer readable medium having recorded instructions thereon which, when executed by a processor, make the processor perform a method for performing radio communication according to claim 14.

* * * * *